United States Patent
White et al.

(10) Patent No.: US 6,169,975 B1
(45) Date of Patent: Jan. 2, 2001

(54) POINT-OF-DISTRIBUTION PRE-PAID CARD VENDING SYSTEM

(75) Inventors: James L. White, Atlanta, GA (US); James A. White, Cary, NC (US)

(73) Assignee: LDC Direct Ltd., Atlanta, GA (US)

(*) Notice: Under 35 U.S.C. 154(b), the term of this patent shall be extended for 0 days.

(21) Appl. No.: 08/890,245

(22) Filed: Jul. 9, 1997

Related U.S. Application Data

(60) Provisional application No. 60/021,422, filed on Jul. 9, 1996.

(51) Int. Cl.[7] .................................................. G06F 17/60

(52) U.S. Cl. ........................ 705/44; 705/39; 235/381; 364/479.01; 364/479.07

(58) Field of Search .................................. 705/43, 44, 39; 364/479, 479.01, 479.02, 479.03, 479.04, 479.05, 479.06, 479.07; 379/114; 235/379, 380, 381

(56) References Cited

U.S. PATENT DOCUMENTS

| | | | |
|---|---|---|---|
| 3,833,795 | 9/1974 | Shoshani et al. | 235/61.7 |
| 4,650,975 | 3/1987 | Kitchner | 235/375 |
| 4,877,947 | 10/1989 | Mori | 235/381 |
| 4,912,310 | 3/1990 | Uemura et al. | 235/380 |
| 4,968,783 | * 11/1990 | Dethloff et al. | 235/380 |
| 4,968,873 | 11/1990 | Dethloff et al. | 235/380 |
| 5,023,782 | 6/1991 | Lutz et al. | 364/405 |
| 5,101,098 | 3/1992 | Naito | 235/475 |
| 5,119,293 | 6/1992 | Hammond | 364/401 |
| 5,146,067 | 9/1992 | Sloan et al. | 235/381 |
| 5,155,342 | 10/1992 | Urano | 235/380 |
| 5,243,174 | 9/1993 | Veeneman et al. | 235/381 |
| 5,266,781 | 11/1993 | Warwick et al. | 235/375 |
| 5,313,664 | 5/1994 | Sugiyama et al. | 364/405 |
| 5,326,960 | 7/1994 | Tannenbaum | 235/379 |
| 5,340,969 | * 8/1994 | Cox | 235/381 |
| 5,350,906 | * 9/1994 | Brody et al. | 235/379 |

(List continued on next page.)

FOREIGN PATENT DOCUMENTS

| | | | |
|---|---|---|---|
| 0 572 991 B1 | 10/1996 | (EP) | H04M 17/02 |
| WO 85/03787 | 8/1985 | (WO) | G06F 15/20 |
| WO 95/12169 | 5/1995 | (WO) | G06F 15/30 |
| WO 97/19549 | 5/1997 | (WO) | H04M 15/00 |

OTHER PUBLICATIONS

Ullman, J.D., Principles of Database and Knowledge–Base Systems, vol. 1 (Computer Science Press: 1988, pp. 23,24, and 43 through 49).*
Panasonic KU–R3100/KU–3000 Basic Specification sheet.

Primary Examiner—Emanuel Todd Voeltz
Assistant Examiner—Alexander Kalinowski
(74) Attorney, Agent, or Firm—Needle & Rosenberg, P.C.

(57) ABSTRACT

A novel system and process have been developed whereby a prepaid phone card, or any other similar inventory, may be easily and efficiently distributed at, for example, a point-of-sale. A computerized terminal including memory for storage is maintained at the point-of-distribution, or any other suitable location. The terminal's memory is adapted to store one or more security numbers, such as PIN numbers, telephone numbers and/or other suitable information corresponding to the information needed by consumers to utilize the service. The terminal initially connects to a host computer system in order to download one or more PIN numbers, and the downloaded PIN numbers are thereafter stored in the terminal's memory. The security codes, etc., may thereafter be dispensed by a user of the terminal onto cards, etc., without any need to connect to a host computer, and the terminal may be recharged with additional security codes, etc., only at a convenient time (e.g., at night). Detailed reporting may also be performed by the terminal, the host computer, or both. A mechanism for guiding the card into the terminal, as well as an assembly for securing an attached magnetic stripe reader may also be provided.

20 Claims, 11 Drawing Sheets

U.S. PATENT DOCUMENTS

| | | | |
|---|---|---|---|
| 5,359,182 | 10/1994 | Schilling | 235/380 |
| 5,408,417 * | 4/1995 | Wilder | 364/479 |
| 5,409,092 | 4/1995 | Itako et al. | 194/210 |
| 5,440,108 | 8/1995 | Tran et al. | 235/281 |
| 5,479,003 | 12/1995 | Yamada | 235/475 |
| 5,481,094 | 1/1996 | Suda | 235/383 |
| 5,483,048 * | 1/1996 | Kobayashi | 235/380 |
| 5,504,808 | 4/1996 | Hamrick, Jr. | 379/144 |
| 5,511,114 | 4/1996 | Stinson et al. | 379/114 |
| 5,513,117 | 4/1996 | Small | 364/479 |
| 5,557,518 | 9/1996 | Rosen | 364/408 |
| 5,696,908 * | 12/1997 | Muehlberger et al. | 705/39 |

* cited by examiner

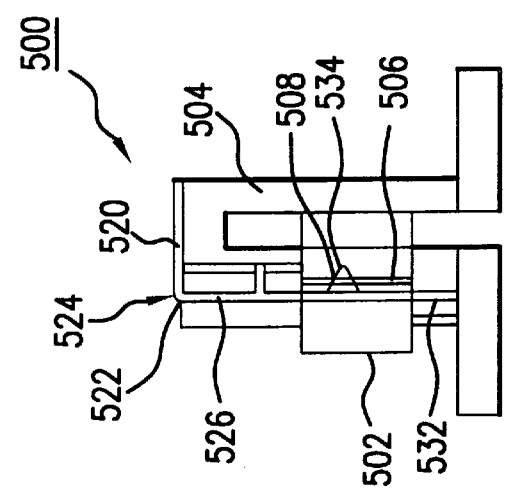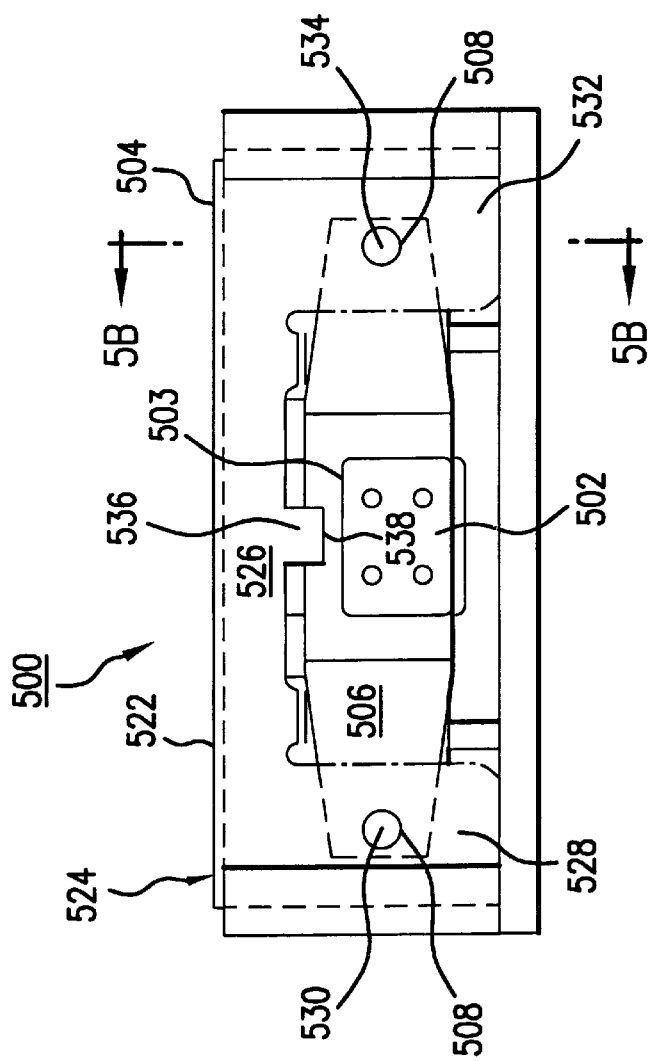

STORE #1136

| DATE SOLD | TIME SOLD | CLERK ID# | UNITS | RETAIL PRICE | ADJUSTMENT | WHOLESALE |
|---|---|---|---|---|---|---|
| 4/2/96 | 7:28:47 AM | 3 | 10 | $5.00 | ACTV | $2.70 |
| 4/2/96 | 2:51:58 PM | 3 | 10 | $5.00 | ACTV | $2.70 |
| 4/3/96 | 6:37:00 PM | 4 | 30 | $15.00 | ACTV | $8.10 |
| 4/4/96 | 7:58:39 AM | 3 | 10 | $5.00 | ACTV | $2.70 |
| 4/4/96 | 7:00:30 PM | 4 | 30 | $15.00 | ACTV | $8.10 |
| 4/4/96 | 7:49:05 PM | 4 | 30 | $15.00 | ACTV | $8.10 |
| 4/5/96 | 5:48:17 PM | 4 | 10 | $5.00 | ACTV | $2.70 |
| 4/6/96 | 4:03:57 PM | 4 | 10 | $5.00 | ACTV | $2.70 |
| 4/9/96 | 8:34:13 AM | 3 | 30 | $15.00 | ACTV | $8.10 |
| 4/9/96 | 8:42:31 AM | 3 | 30 | $15.00 | ACTV | $8.10 |
| 4/12/96 | 2:14:28 PM | 4 | 15 | $7.50 | ACTV | $4.05 |
| 4/13/96 | 4:02:06 PM | 4 | 60 | $30.00 | ACTV | $16.20 |
| 4/13/96 | 4:12:32 PM | 4 | 10 | $5.00 | ACTV | $2.70 |
| 4/14/96 | 1:42:01 PM | 4 | 10 | $5.00 | ACTV | $2.70 |
| 4/14/96 | 3:21:59 PM | 4 | 0 | $0.00 | VOID | $0.00 |
| 4/14/96 | 3:22:37 PM | 4 | 30 | $15.00 | ACTV | $8.10 |
| 4/15/96 | 11:27:18 AM | 3 | 10 | $5.00 | ACTV | $2.70 |
| 4/15/96 | 12:32:05 PM | 3 | 60 | $30.00 | ACTV | $16.20 |
| 4/15/96 | 12:32:35 PM | 3 | 60 | $30.00 | ACTV | $16.20 |
| 4/16/96 | 6:57:30 PM | 4 | 15 | $7.50 | ACTV | $4.05 |
| 4/18/96 | 10:31:40 AM | 3 | 10 | $5.00 | ACTV | $2.70 |
| 4/18/96 | 10:31:57 AM | 3 | 10 | $5.00 | ACTV | $2.70 |
| 4/18/96 | 10:56:27 AM | 3 | 30 | $15.00 | ACTV | $8.10 |
| 4/18/96 | 11:42:19 AM | 3 | 10 | $5.00 | ACTV | $2.70 |
| 4/22/96 | 11:25:53 AM | 3 | 30 | $15.00 | ACTV | $8.10 |
| 4/23/96 | 5:14:35 PM | 4 | 30 | $15.00 | ACTV | $8.10 |
| 4/25/96 | 9:37:25 AM | 3 | 10 | $5.00 | ACTV | $2.70 |
| 4/25/96 | 2:28:21 PM | 4 | 15 | $7.50 | ACTV | $4.05 |
| 4/25/96 | 2:59:27 PM | 4 | 10 | $5.00 | ACTV | $2.70 |
| 4/26/96 | 7:19:06 PM | 3 | 10 | $5.00 | ACTV | $2.70 |
| 4/26/96 | 8:40:39 PM | 4 | 10 | $5.00 | ACTV | $2.70 |
| 4/29/96 | 6:00:12 AM | 3 | 10 | $5.00 | ACTV | $2.70 |
| SUBTOTAL | | | 655 | $327.50 | | $176.85 |

FIG.10

POINT-OF-DISTRIBUTION PRE-PAID CARD VENDING SYSTEM

CROSS REFERENCE TO PROVISIONAL APPLICATION

This application claims priority based on U.S. Provisional application Serial No. 60/021,422, filed Jul. 9, 1996.

BACKGROUND OF THE INVENTION

1. Field of the Invention

This invention generally relates to a system for distributing, dispensing and recording transactions relating to pre-paid cards and/or other inventory, such as pre-paid long distance telephone cards, at one or more point-of-distribution locations, such as in a retail establishment.

2. Description of the Prior Art

Over the past few years, pre-paid long distance telephone cards (pre-paid phone cards) have become increasingly popular as a convenient way to pay for long distance telephone calls. Pre-paid phone cards look similar to credit cards, but they work like gift certificates for long distance service—they may be purchased in selected denominations, thus allowing the holder of the card to make long distance telephone calls for a preselected number of minutes, etc.

The front of a pre-paid phone card typically contains some type of graphic image, while either the front or the back of the card includes a telephone number (such as a toll-free 800 number) as well as a personal identification number (PIN) that may be used to make the long distance telephone call. In operation, the holder of the pre-paid phone card dials the telephone number printed on the back of the card, and when prompted, dials the PIN number and the telephone number to be called. The call thereafter is connected, and the caller may receive audible warnings indicating how much long distance time is left on the card.

Pre-paid phone cards have traditionally been available to consumers at retail establishments, such as in grocery stores, drug stores, gift shops, and the like. In the past, pre-activated pre-paid phone cards would be shipped to the retailer, and the retailer would then sell the cards to interested consumers. Of course, because the phone cards would already be activated when they were shipped to the retailer, if such cards were stolen they could essentially be used like cash by the thief to make long distance telephone calls, or could be re-sold on the black market. Also, such systems do not lend themselves to allowing the retail establishment owner to track the sales in detail. For example, it may be difficult for the retail owner to determine which of his sales clerks were making the most sales of pre-paid phone cards, and at what time of day such sales were being made.

Some of the deficiencies of prior art systems have been addressed to a small extent by systems whereby PIN numbers pre-printed on phone cards are only activated by the retailer after the sale of the card is made to the consumer. In these systems, the retailer or the retailer's computer terminal dials into a central host computer system each time a card sale is made, and the host computer system is instructed to activate the PIN number on the sold card. Unfortunately, while this is an improvement over prior systems, there are still significant problems with these newer systems. Since the pre-printed PIN numbers have to be activated after each sale, much time is wasted by the sales clerk during the activation process. Moreover, because a long distance call is often required to contact the host computer system, significant long distance charges are (ironically) incurred just to activate each card. Additionally, if for some reason the activation phone number is busy, or the host computer system is otherwise unavailable, the sale simply can't be made.

SUMMARY OF THE INVENTION

There is therefore a need for an improved system for activating and distributing pre-paid inventories, such as pre-paid phone cards, to consumers.

A novel system and process have been developed whereby a prepaid phone card, or any other similar pre-paid inventory, may be easily and efficiently distributed at, for example, a point-of-sale. A computerized terminal including memory for storage is maintained al the point-of-distribution, or any other suitable location. The terminal's memory is adapted to store one or more PIN numbers, telephone numbers and/or other suitable information corresponding to the information needed by consumers to utilize the cards. The terminal initially connects to a host computer system in order to download one or more PIN numbers, and the downloaded PIN numbers are thereafter stored in the terminal's memory.

When a consumer wishes to purchase a pre-paid phone card, a sales clerk at the point-of-distribution (e.g., the point-of-sale) may receive payment from the consumer, and the clerk enters the order into the terminal. Because the terminal's memory may already be pre-loaded with numerous PIN numbers, the terminal selects one of the PIN numbers from memory, and this PIN number may be printed on a previously blank card, along with any other necessary information. The PIN number may be printed on the card in a number of ways. The clerk may insert the card into a slot on an attached printer, whereby the printer prints the PIN number directly on the card, or the printer may print the PIN number on an adhesive label which thereafter may be affixed to the card, or the printer may simply print the PIN number, etc., on a paper receipt. In any event, the PIN number, etc., is only placed onto the card or paper after the sale is made.

In addition to the PIN number being placed on the card, information about the transaction may be stored in the terminal's memory. For example, the time, date, sales clerk number, dollar and time value of the card, and the PIN number may be stored in memory. Later, such as at night when long distance rates are cheapest, when the store is closed, or at any other suitable time, all data from the previous transactions may be transmitted to the host computer system for further processing. For example, the host computer system may generate reports regarding sales which may be sent to the store owner, etc.

After the terminal transmits data regarding previous transactions to the host computer system, the host computer system may download additional PIN numbers, etc. to the terminal for subsequent sales. For example, if ten PIN numbers are dispensed during one day, then after the terminal transmits the information about the ten transactions to the host computer system, the host computer system will download ten new PIN numbers to the terminal to replenish the terminal's stock. Thus, the terminal will virtually never be out of stock of PIN numbers.

If a store experiences heavy sales of cards with PIN numbers, the present invention may be implemented to not wait until night, etc. to transmit the transaction information to the host computer. Rather, the terminal may be designed to transmit the transactional information to the host computer system any time its PIN number supply is running low, so that the terminal's supply of PIN numbers is replenished.

Finally, a mechanism for guiding the card into the terminal, as well as an assembly for securing an attached magnetic stripe reader may also be provided.

BRIEF DESCRIPTION OF THE DRAWINGS

FIGS. 5A–5B depict various views of a magnetic stripe reader assembly that may be used with the present invention.

FIG. 10 depicts a sample report that may be generated by the present invention.

DETAILED DESCRIPTION OF THE PREFERRED EMBODIMENTS

The present invention may be understood more readily by reference to the following detailed description of preferred embodiments of the invention and to the Figures.

Before the present devices and methods are disclosed and described, it is to be understood that the terminology used herein is for the purpose of describing particular embodiments only and is not intended to be limiting. It must be noted that, as used in the specification and the appended claims, the singular forms "a," "an" and "the" include plural references unless the context clearly dictates otherwise.

Figure 1:
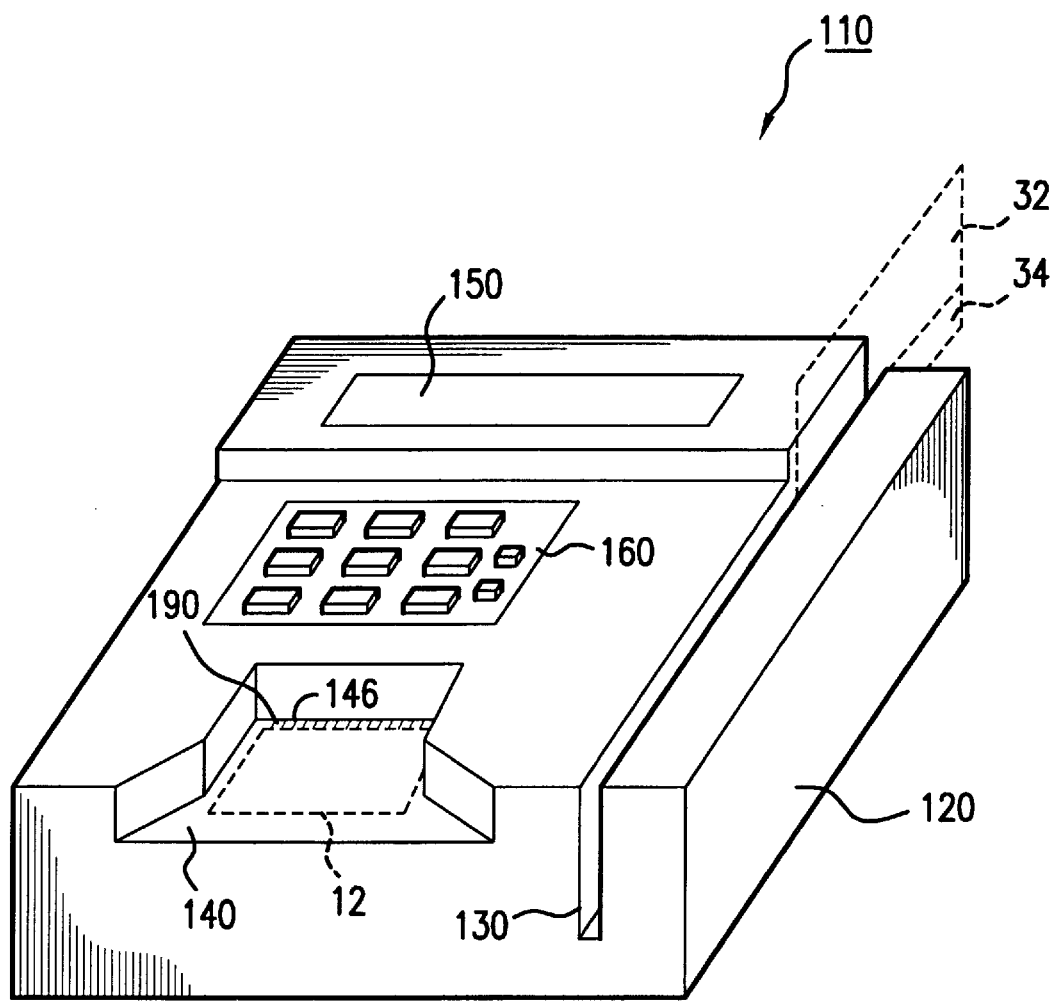
FIG. 1 is a perspective view of a point-of-distribution terminal as may be used in the present invention.

As shown in FIG. 1, in one embodiment, the present invention is a device 110 for vending prepaid telephone cards 12, or other equivalent inventories. For purposes of describing the present invention, cards 12 may refer to pre-paid phone cards, pre-paid cellular telephone cards, pre-paid gasoline cards, pre-paid DSS satellite cards, or any other article utilizing a PIN-type system that may be dispensed to a user.

The device 110 includes a housing 120 that encloses a magnetic stripe reader, a thermal printer and an electronic control and communication apparatus (not specifically shown in FIG. 1, but described in extensive detail later). Disposed on the housing 120 is an electronic key pad 160, for receiving user input, and a digital display 150, such as a dot matrix or segmented LCD display, or a vacuum fluorescent display. The housing 120 defines a slot 130 through which a card 32, such as a credit card or a debit card, may pass so that a magnetic stripe 34 on the card 32 may be read by the magnetic stripe reader. The housing 120 also defines an indentation 140 for guiding a card 12 into a slot 146 toward the printer.

Figure 2A:
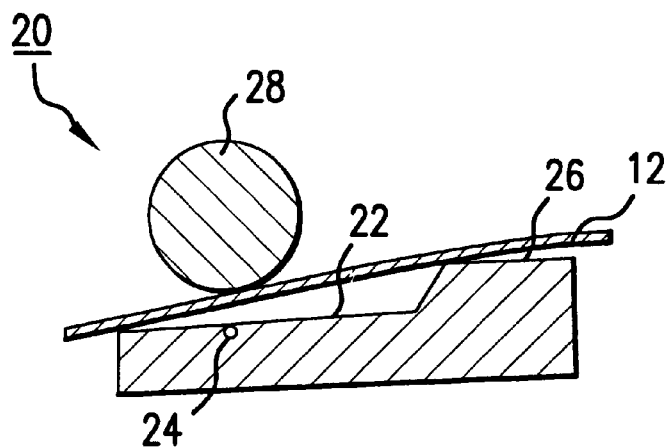
FIG. 2A depicts a prior art thermal printer.

As shown in FIG. 2A, a thermal printer 20 of the type commonly found in the prior art for printing on paper, comprises a thermal print head 24 disposed on a planar area 22. For example, thermal printer 20 may comprise in one embodiment a "mini-printer" available from Axiohm, of Montrouge, France.

Figure 2B:
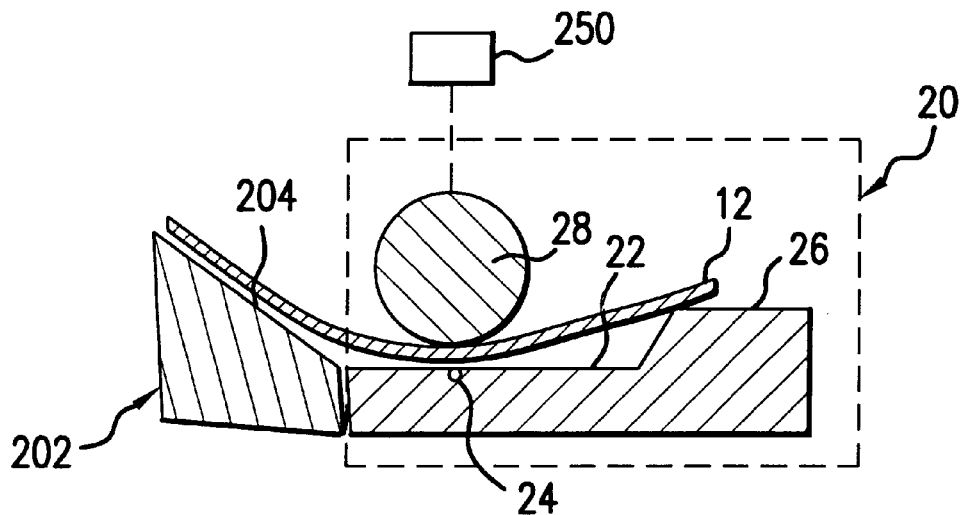
FIG. 2B depicts an improved thermal printer configuration that may be used with the present invention.

Typically, a raised surface 26 extends from the planar area 22 and a roller platen 28 (controlled by a motor 250) is disposed adjacent the print head 24. The motor 250 is depicted in FIG. 2B as connected to the roller 28 via dashed lines. This convention simply indicates that the motor 250 may be connected to the roller 28 through any conventional drive mechanism.

When a material of low rigidity, such as light weight paper, the roller platen 28 puts force on the paper toward the print head 24 so that the paper is in contact with the print head 24 and the print head prints the paper. However, when printing a material of higher rigidity, such as a prepaid telephone card 12, the roller platen 28 is unable to cause the surface of the card 12 to make close contact with the print head 24, thus reducing the quality of the printing.

As shown in FIG. 2B, the invention solves this problem with an apparatus 202 that includes a directing surface 204 that deflects the card at an angle from the planar area 22, thereby allowing the roller platen 28 to push the card 12 against the print head 24.

Figure 3:
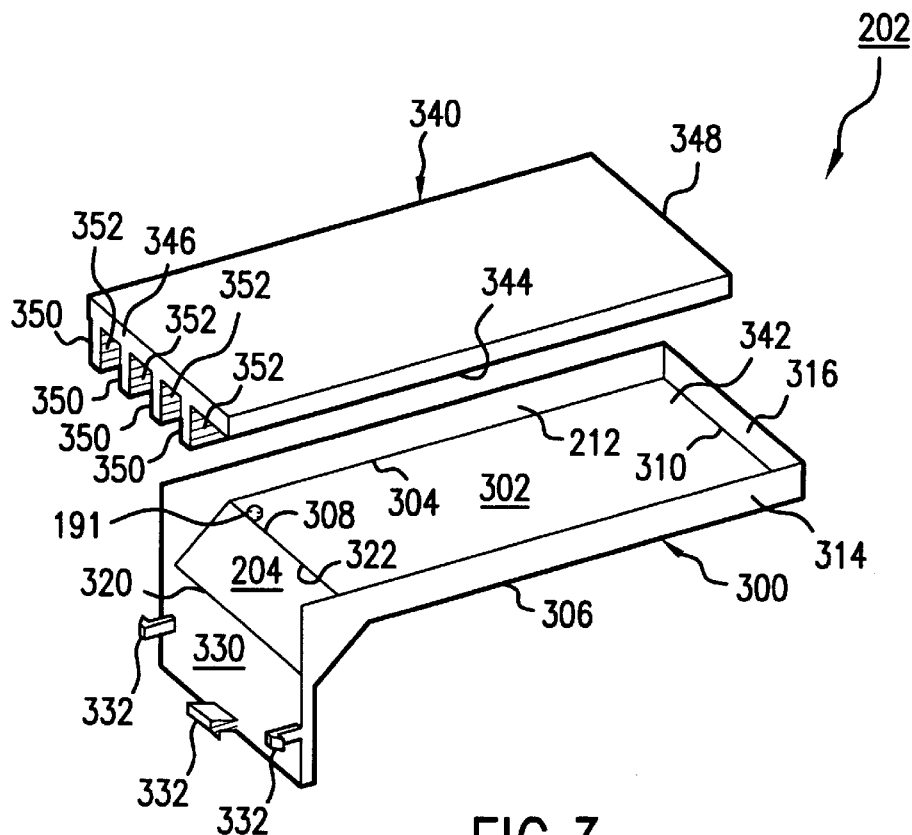
FIG. 3 depicts a deflecting apparatus that may be used with the present invention.

As shown in FIG. 3, the deflecting apparatus 202 comprises a frame 300 that is affixable to a thermal printer (not shown in FIG. 3). The frame 300 includes a bottom surface 302 terminating in a first side edge 304, an opposite second side edge 306, a first end edge 308 and an opposite second end edge 310. A first upstanding side wall 312 extends from the first side edge 304, an opposite second upstanding side wall 314 extends from the second side edge 306 and a first upstanding end wall 316 extends from the second end edge 310 a first directing surface 204 depends from the first end edge 308 and has a proximal edge 320 and an opposite distal edge 322 adjacent the first end edge 308 of the bottom surface 302. The first directing surface 204 is disposed at a first angle relative to the planar area 22 so that a card 12 passing between the thermal print head 24 and the roller platen 28 is directed so as to pass along the first directing surface 204 at the first angle away from the planar area 22, thereby reducing any distance between the card 12 and the print head 24. The preferred first angle for a deflecting apparatus 202 used in conjunction with a "Miniprinter" thermal printer available from Axiohm is 45 degrees (although it will be recognized a different first angle may be preferable when used with other types of printer).

A member 330 depends from the distal edge 322 of the first directing surface 204 that includes a structure that attaches the frame 300 to the thermal printer. (or other similar device). The attaching structure comprises at least one snap 332 laterally extending from the depending member 330, away from the frame 202, for engagement with the thermal printer 20. As will be recognized, other structures for attaching the frame 300 to the thermal printer may be employed without departing from the scope of the invention.

A cover plate 340 is disposed opposite the bottom surface 302 of the frame 202, so that the cover plate 340, the first side wall 312, the second side wall 314 and the end wall 316 define a cavity 342 for receiving a card 12 therein. The cover plate 340 comprises a second directing surface 344 disposed at a second angle from the first angle. The second directing surface 344 is provided to direct the card to its original direction of travel, thereby reducing the amount of vertical space required. The cover plate 340 has a leading edge 346 and an opposite trailing edge 348 a plurality of guide fingers 350 depend from the leading edge 346, the guide fingers 350 have an angled surface 352 disposed opposite from and complimentary to the first directing surface 204 for maintaining close proximity to the first deflecting angle of frame 202, thereby preventing the card 12 from curling in the event of printer overdrive.

The first end wall 316 is disposed at a distance from the thermal print head 24 that is no greater than a preselected distance corresponding to the length of a card 12 guided through the thermal printer. If the distance between the first end wall 316 and the thermal print bead 24 is not less than the length of the card 12, then the card 12 could be locked permanently in the cavity 342.

Figure 4A:
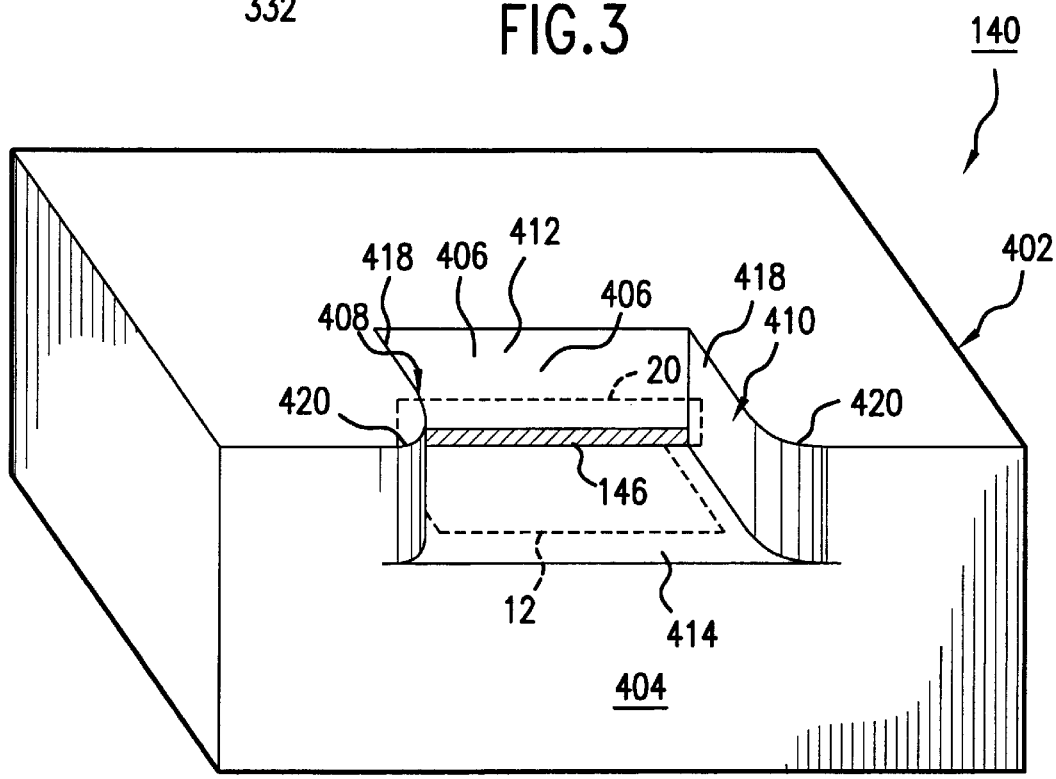
FIGS. 4A–4C depict various views of a card guide that may be used with the present invention.
Figure 4B:
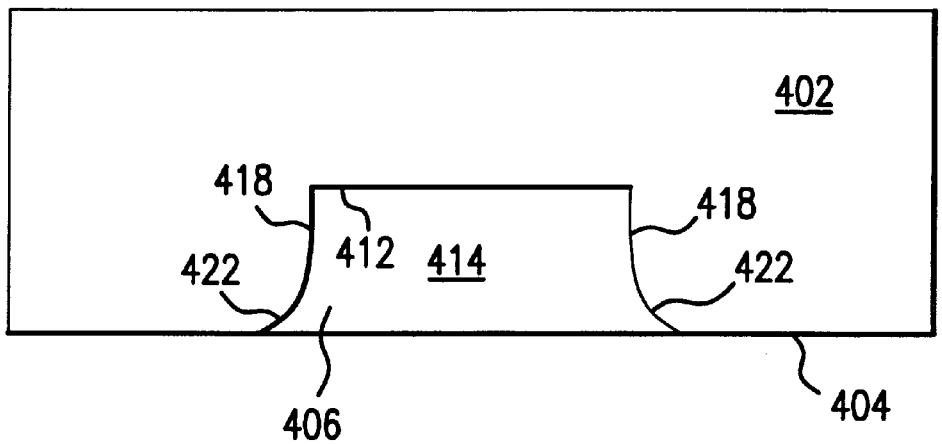
Figure 4C:
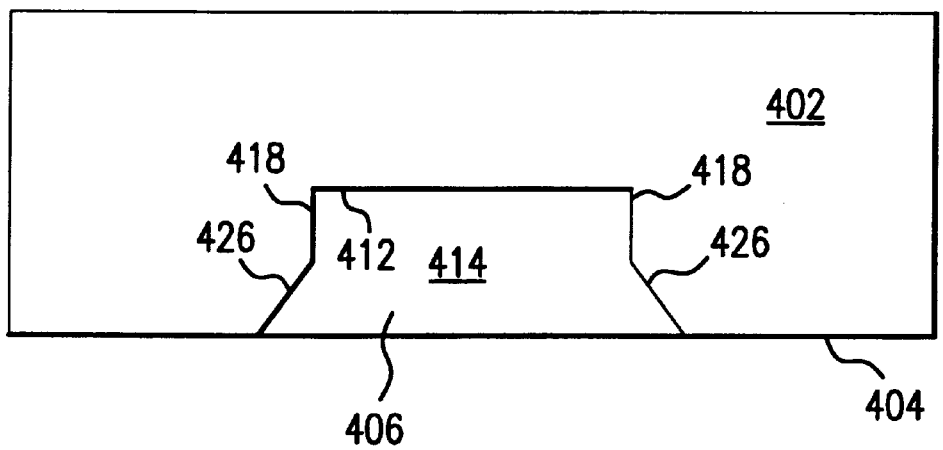

As shown in FIG. 4A, the invention includes an apparatus 140 for guiding the card 12 into the printer 20 when the print head that is wider than the card. The guiding apparatus 140 includes a frame 402 housing the printer 20 and having a front surface 404. An indentation 406 is defined by a first side wall 408 extending inwardly from the front surface 404, in opposite second side wall 410 extending inwardly from the front surface 404, the first and second side walls 408, 410 being interconnected by an upstanding end wall 412, and a lateral bottom surface 414. The end wall 412 defines a slot 416, adjacent the bottom surface 414 that extends from the first side wall 408 to the second side wall 410, for receiving a card 12 therein for receipt by the printer 20. The first and second side walls 408, 410 each have a straight portion 418 extending from the end wall 412. The distance between the respective straight portions 418 is slightly greater than the width of a selected card 12, so that the card 12 when placed against the bottom surface 414 and between the straight portions 418 is in alignment for printing by a preselected portion of the printer 20. a guiding stricture 420 interconnects each straight surface 408 of each side wall to the front surface 404 of the frame 402. The guiding structures 420 guide the card 12 placed against the bottom surface 414 between the straight portions 418 of the side walls 408, 410. As shown in FIG. 4B, the guiding structure 420 could include a curved portion 422 extending from each straight portion 418 to the front surface 404 of the frame 402. As shown in FIG. 4C, in an alternative embodiment, the guiding structure 420 comprises a guiding portion 426 extending at an obtuse angle from each straight portion 418 to the front surface 404 of the frame 402.

As shown in FIGS. 5A and 5B, the invention includes a bracket 500 for securing a magnetic stripe reader 502 to a housing 504 that is enclosed in the housing 120 adjacent the magnetic stripe reader slot 130. The magnetic stripe reader has a top surface 503 and is affixed to a holding member 506 and has an operative orientation and an inoperative orientation. The holding member 506 defines two holes 508 passing therethrough that are spaced apart on opposite sides of the magnetic stripe reader 502. The bracket 500 comprises a lateral member 520 having a first edge 522, with a transverse member 524, depending from the first edge 522 and having a bottom edge 526. A first member 528 depends from the bottom edge 526 and a first detente 530 for engagement with a first of the holes 508 defined by the holding member 506 extends from the first member 528. A second member 532 depends from the bottom edge 526 and is spaced apart from the first member 528. A second detente 534 for engagement with a second of the holes 508 defined by the holding member 506 extends from the second member 532. A tab 536 depends from the bottom edge 526 between the first member 528 and the second member 532. The tab 536 has an end 538 that abuts the top surface 503 of the magnetic stripe reader 502. The tab 536 also has a length so that the holes 508 defined by the holding member 506 engage the detentes 530, 534 extending from the first member 528 and the second member 532 only when the magnetic stripe reader 502 is placed in the operative position. This prevents the magnetic stripe reader 502 from being emplaced upside-down, thereby improving quality and saving manufacturing costs.

Figure 6:
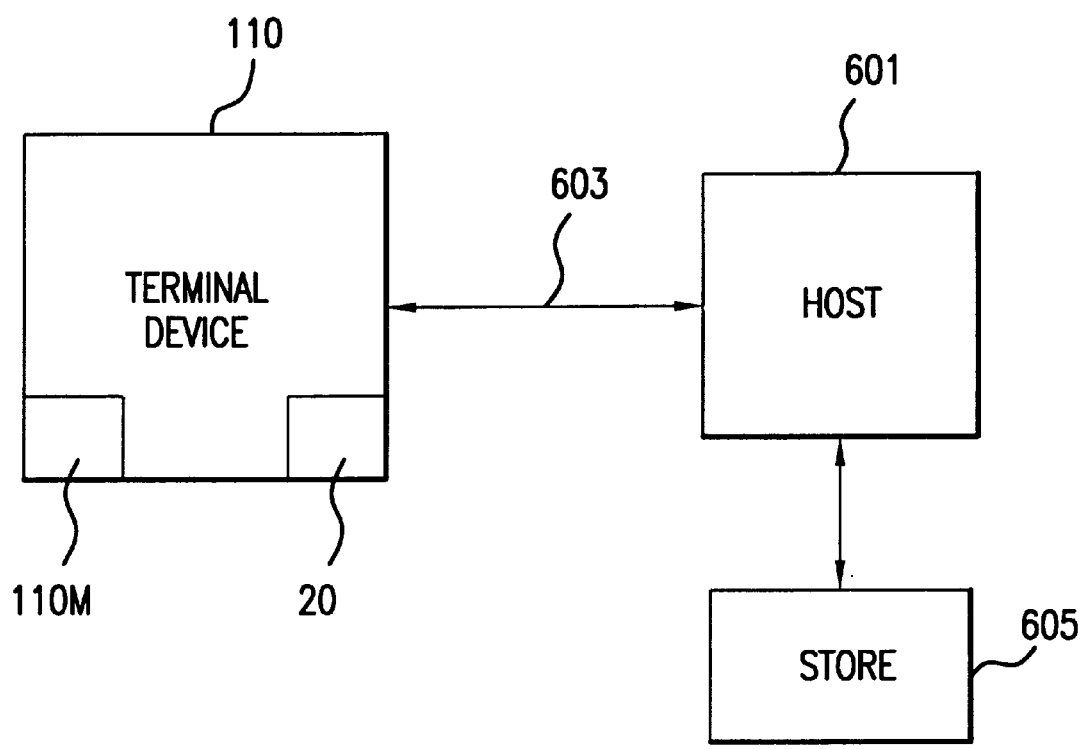
FIG. 6 is a schematic block diagram depicting an overall data distribution system that may be used with the present invention.
Figure 7:
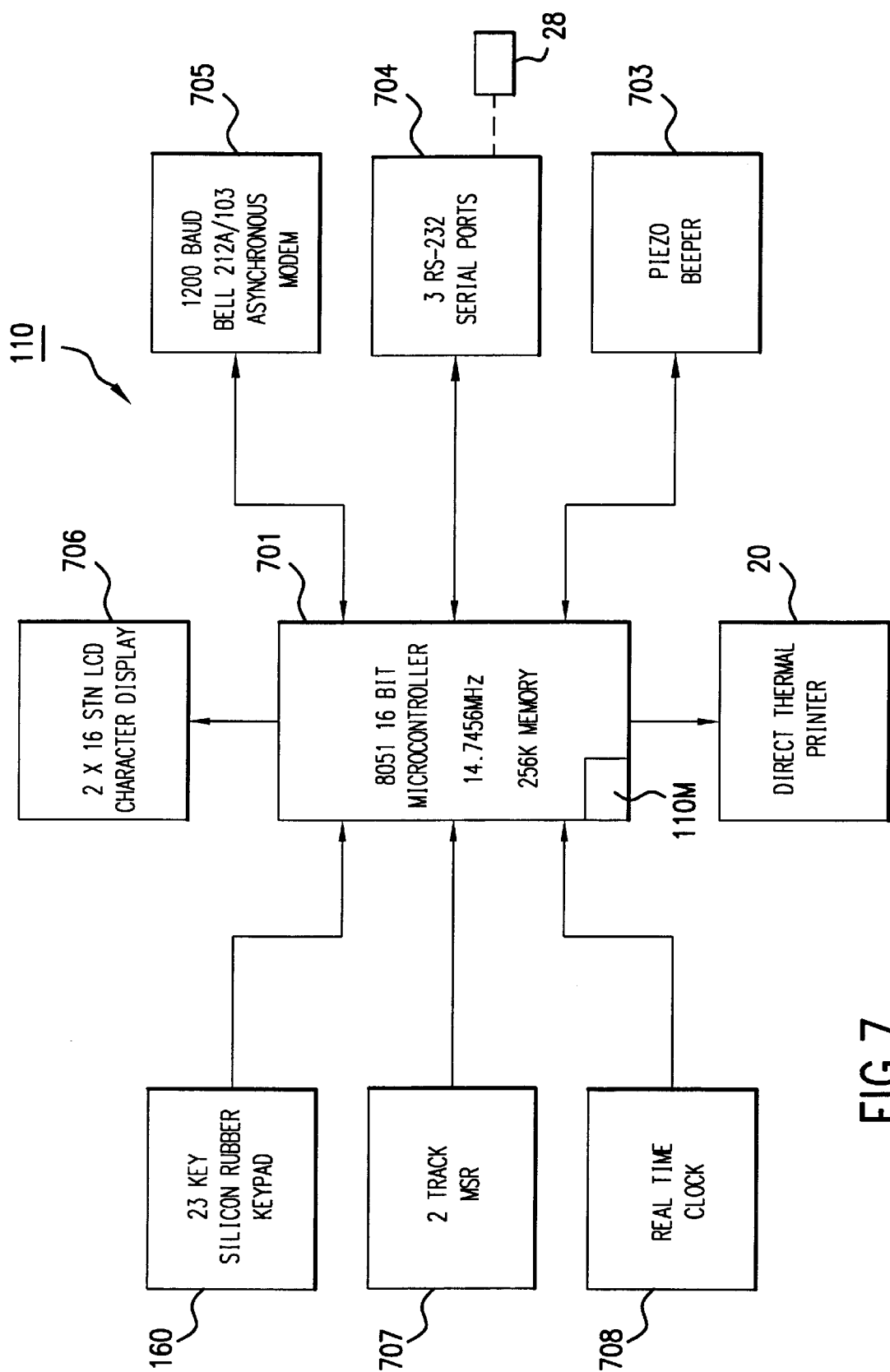
FIG. 7 is a schematic block diagram of a point-of-distribution terminal that may be used with the present invention.
Figure 8:
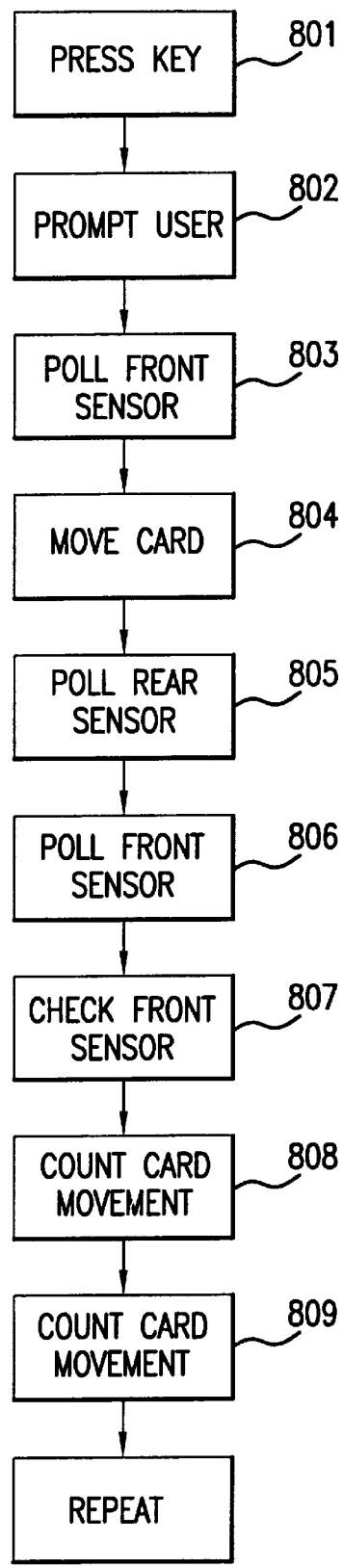
FIGS. 8–9 are flow diagrams that depict the operation of various features of the present invention.

Referring to FIGS. 6 and 7, block diagrams are shown that illustrate the overall schematic configuration of the system of the present invention, which includes one or more terminal devices 110 as one component (FIG. 6), as well as a more detailed schematic configuration of a terminal device 110 (FIG. 7). The terminal devices 110 depicted in FIGS. 6 and. 7 refer to the same terminal device 110 whose mechanical features were previously described with respect to FIGS. 1–5B. It will be readily recognized by those of ordinary skill in the art that the system of FIGS. 6 and 7 may be implemented with or without the mechanical features of FIGS. 1–5B. Additionally, FIG. 8 is a flow diagram depicting a process performed by the systems of FIGS. 6 and 7 in one embodiment.

Referring to FIG. 6, a host computer system 601 may download PIN numbers, access numbers, and/or various other types of data to the memory 110M within a terminal 110 at the point of sale. The host computer system 601 also receives transactional information transmitted from the memory 110M of the terminal 110 on a periodic basis, as will be described in further detail below. Of course, many different terminals 110 may be implemented simultaneously in the same or different locations, and all of these may be used in conjunction with one or more host computer systems 601.

In a preferred embodiment, the host computer system 601 may comprise any readily available computer system, such as a Pentium Pro 200 computer available from Micron Electronics. Of course, any other suitable computer system capable of hosting a relational database may be used as well. The terminal 110 may comprise the terminal 110 illustrated in block format in FIG. 7.

Referring to FIG. 7, the terminal device 110 may include any one of a variety of suitable processors 701, such as an 8051 16-bit microcontroller 701 operating at 14.7456 Mhz, available from Philips Semiconductor. The processor 701 may include 256K of memory 110M, or any other appropriate amount.

The processor 701 may be coupled to a variety of other devices, such as a direct thermal printer 20 (previously described, but which may also comprise many other types of printer); piezo beeper 703, which may comprise a model PKM17EPP-4001S available from Murata Erie, I/O ports 704, which may comprise 3 RS-232 serial ports, such as model number TL16C452FN available from Texas Instruments; modem 705 which may comprise a 1200 baud Bell 212A/103 asynchronous mode, such as model number 73K212AL-IH available from Silicon Systems; LCD character display 706, which may comprise a 2×20 STN LCD character display, such as model number HC20202NG available from Hyundai Semiconductor; 2 track magnetic stripe reader (MSR)/decoder 707, which may comprise model number 21006516 available from Magtek; a real time clock 708, which may comprise model number NJU6355EM available from NJRC, as well as a 23 key silicon rubber keypad 160, previously described.

Certain of the components of device 110 shown in FIG. 7 (with the notable exception of the printer 20) may operate together in an analogous way as in previously known point-of-sale terminals, such as an Omni 380 terminal, available from Verifone. However, the device 110 of the present invention greatly expands on the state-of-the-art in point-of-sale terminals, with the addition of an integrated printer 20 for printing directly on cards 12, and related novel functionality. In an alternate embodiment, terminal device 110 may comprise a Verifone terminal (or equivalent) with an attached printer 20.

The host computer system 601 and the terminal may be coupled by way of any suitable communication medium 603, such as via modem 705 and telephone, via the Internet, via a public or private network, etc.

Again, and as shown in FIG. 7, a printer 20 may be coupled to the processor 701 in one embodiment of the present invention. The printer 20 may be used to print the PIN numbers, access numbers, and/or any other relevant information on blank cards 12, directly, by printing on an adhesive label, etc. FIG. 2B, and its associated written description, describes one technique that may be used to print directly on a card 12. In another embodiment, the printer 20 may comprise any other type of printer for printing directly on the card 12, for printing on adhesive labels that may be affixed to the card, or for merely printing on a paper receipt, etc.

FIG. 8 is a flow diagram illustrating how the terminal device 110 may detect the existence of a card 12 and process it accordingly. The process of FIG. 8 may be implemented by suitable programming of the processor 701, with control of the roller platen 28 of FIG. 213, and related mechanisms, through serial port 704.

In step 801, the user of the device 110 may press a key on the keypad 160 to indicate that a transaction is to begin. In step 802, the terminal device 110 may prompt the user to insert the card 12 into slot 146, such as by using the display 706 or the beeper 703.

In step 803, the processor 701 begins polling the front reflective opto sensor 190 (position shown in FIG. 1). In step 804, once a card 12 is detected by the processor 701, the printer rotor 250 begins moving the detected card 12 into the interior of the device 110.

In step 805, the processor 701 begins polling the rear reflective opto sensor 191 (position shown in FIG. 3). If the card is not detected within a certain amount of time (say, 2 seconds), the motor 250 is turned off and an error message is displayed on the display 706, or an error warning is sounded on beeper 703, etc.

In step 806, if the card is detected, the processor 701 begins to poll the front sensor 190 again. In step 807, the front sensor 190 is checked in order to determine whether the appropriate signal is detected. For example, if white space on the card 12 is expected, then the processor 701 determines if the front sensor is detecting white space. If not, an error message is displayed on display 706, or sounded on beeper 703, and the card 12 is ejected by roller 28, driven by motor 250.

In step 808, if, for example, white area is present at the appropriate place on the card 12 (or if any other suitable identifier is found on the card, such as bar coding, or other markings), the processor 701 may count how far the card has moved relative to the roller 28 by keeping count of the number of steps the printer motor 250 has made. If another identifying marking on the card (such as black space) does not appear under the front sensor 190 within a given number of steps, an error message may be generated on the display 706, or sounded on beeper 703, etc., and the card 12 may be ejected by the roller 28 (driven by the motor 250).

In step 809, the processor 701 counts the number of printer motor 250 steps while the area under the front sensor 190 is black, etc. If the black area is present for too short or too long a time, an error message is generated on the display 706, or sounded on the beeper 703, and the card 12 is ejected by the roller 28 (via the motor 250).

Steps 801–809 may be repeated a number of times (e.g., 3) to ensure that the processor 701 and front sensor 190 did not randomly read a text area or other extraneous area that inadvertently appeared as special card 12 markings.

The marking technique described above may be designed in a variety of ways, and different transition combinations may be used to identify different card types. For example, different cards 12 may have different printable area shapes, and this information may be encoded onto the card through bar coding combinations that are detected by the sensors. The possibilities for encoding information on the cards through bar coding techniques are endless, and the above description is given as a non-exhaustive exemplary illustration of the technique.

The front sensor 190 may be connected to an 8-bit analog-to-digital (A/D) converter, which may be coupled to the processor 701 through a port 704. The A/D converter allows the processor 701 to detect different color levels or different reflectivity levels on the card 12 by measuring the intensity of the light reflected back off the card 12. For example, a relatively white area will reflect a relatively large portion of the light energy from the front sensor 190, while a relatively black area will reflect a relatively small portion of the light energy from the front sensor 190.

The processor 701 can determine how far to allow the motor 250 to drive the roller 28 to move the card into the device 110 by keeping track of the motor 250 steps once the rear sensor 191 detects the card's 12 presence.

The downloading, dispensing, and reporting of PIN numbers, and related information, as performed by the present invention, will now be described.

Figure 9:
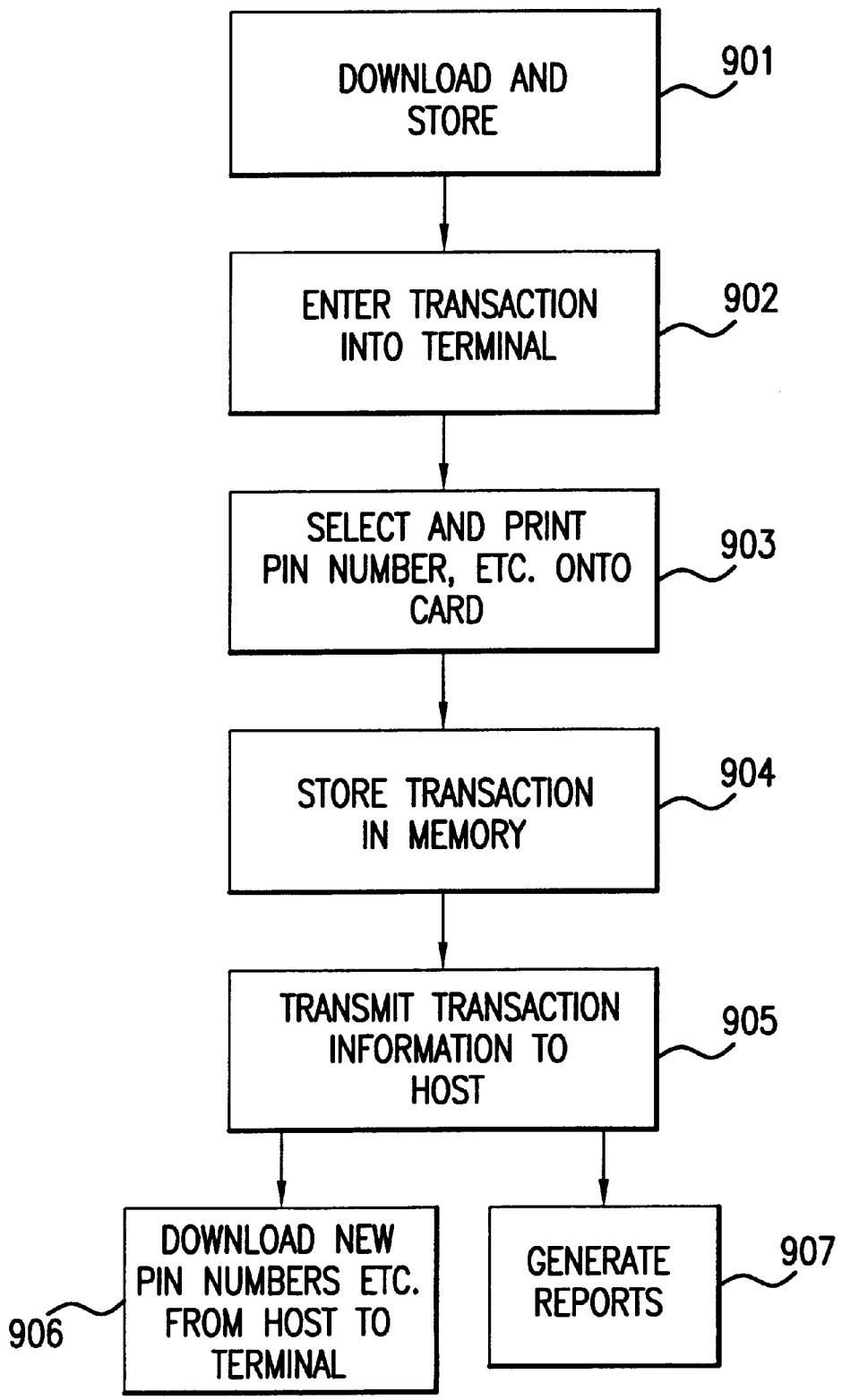

With reference to the flow diagram of FIG. 9, as well as the previously described figures, the terminal 110, including memory 110M for storage, may be maintained at a point-of-distribution within, for example, a retail establishment, or any other desired location. The terminal's memory 110M is adapted to store one or more PIN numbers, telephone numbers, access numbers, or any other variable information to be printed on a card 12, corresponding to the information needed by a consumer to utilize the cards 12. The terminal 110 (under control of processor 701) may initially connect to the host computer system 601 (through modem 705, etc.) in order to download one or more PIN numbers, and the downloaded PIN numbers are thereafter stored in the terminal's memory 110M (step 901 of FIG. 9).

Because the inventory is being stored inside the terminal 110, it preferably must reside in some form of a database within memory 110M. The most simple approach would be to use a flat-file type system where the data is maintained in discrete tables and is sent to the host system 601 in a table-by table fashion. However, this approach has many drawbacks. Perhaps the most serious is the lack of ability to easily change the structure of the underlying tables to meet the needs of a variety of different users. There are other technical concerns as well including the amount of code required to maintain consistency between the individual databases in the terminals 110 and the central database at the host 601.

The present invention provides a unique solution to these and other technical problems. The present architecture is based on a relational database technology.

In one embodiment of the present database approach, there is one master table hard-coded into the terminal 110. This table includes 1 to n records where each record defines the characteristics of the other database tables—those used to carry out the functionality of the terminal 110. Since these other tables exist only as entries in the master table and not as hard code, existing tables can be changed and new tables can be added without having to modify the source code of the terminal 110. For this approach to be effective each of these "functional" tables must be mirrored in the central database.

When the terminal 110 contacts the host computer 601 a replication process occurs whereby changes in the remote tables at the terminal 110 are copied to the central database at the host 601 and changes to the central database are copied to the remote tables. Should there exist a situation where data has changed in both the host system 601 and the terminal 110 since the last replication, a pre-defined process of arbitration is utilized to determine which dataset is replicated. This approach allows the developer to write one replication algorithm that will work for any table regardless of its length or the data types stored within.

Each table in the terminal database may be divided into two sections: local-only fields and replicate-enabled fields. The central database in the host system 601 contains copies only of the replicate-enabled fields.

The local-only fields may be used to track a variety of functions within the terminal 110 and allow for the proper implementation of relational database techniques. Since these fields have no validity outside the context of the terminal 110 they should not and cannot be replicated.

Each table within the terminal 110 can also contain one or more foreign keys to other tables in the terminal 110 and also on the host system 601. The proper application of these keys gives the database application its relational characteristics.

Although the current implementation of the object-oriented shared relational database technology is being used for the distribution of pre-paid inventory, this architecture can be used for many other applications.

In one embodiment of the present invention, the PIN numbers and related information may be downloaded from the host system 601 to the memory 110M of a terminal 110 in an encrypted format, using a known encryption technique. Moreover, once downloaded, the PIN numbers and related information may be stored in memory 110M in an encrypted format, until the time of a sale. After a sale is made (described below), all references to the unencrypted PIN numbers, etc., may be removed from memory 110M.

When a consumer wishes to purchase a pre-paid phone card 12 (or other pre-paid item or service), a sales clerk (or anybody else) at the point-of-distribution (e.g., the point-of-sale) may receive payment from the consumer, and the clerk may enter the order into the terminal 110 (step 902 of FIG. 9). Again, the terminal 110 may include a keypad 160 that may be used by the clerk to enter the appropriate information about the transaction into the terminal 110. Because the terminal's memory 110M may already be pre-loaded with numerous PIN numbers, the processor 701 of the terminal 110 may select one of the PIN numbers from memory 110M. Once this PIN number is selected, it is either removed from the portion of the memory 110M that stores available PIN numbers, or a flag may be set within the memory 110M indicating that the PIN number has been selected. In any event, the terminal 110 normally does not need to contact the host computer system 601 at that point in time, as the memory 110M of the terminal 110 already has been pre-loaded with a number of PIN numbers.

After the PIN number is selected from memory 110M, the terminal 110 may then print the PIN number, and any other related information, on a previously blank card 12 (step 903 of FIG. 9). In one embodiment, the card 12 may simply be a plastic or paper card of the convenient size commonly used for pre-paid phone cards. The card 12 may be coated with a thermal coating for printing in conjunction with a thermal printer 20.

The processor 701 of the terminal 110 may be programmed to print the PIN number on the card 12, by way of the printer 20, in a number of ways. For example, as previously described, the printer 20 may be configured such that a slot 146 is provided in the terminal 110 for insertion of the card 12. A motor 250 and roller 28 drive mechanism may also be provided, as also previously described. By inserting the card 12 into the slot 146, the card 12 may be placed directly adjacent the print head 24, and the printer 20 may thereafter cause the PIN number (and related information) to be printed directly on the card 12.

Alternatively, adhesive labels may be fed into an external printer 20 such that the printer 20 under control of the processor 701 causes the PIN numbers (and related information) to be printed on these labels. The labels may then be affixed to the card 12 (or to any other article). Of course, these are only examples of methods by which the PIN numbers and other information could be placed onto the cards 12 or other suitable articles—many other printing methods exist. In any event, by using the teachings of the present invention, the PIN number, etc. may be placed onto the card only after the sale transaction is made.

In addition to the PIN number being placed on the card 12 once a sale is made, information about the transaction may be stored in the terminal's memory 110M (step 904 of FIG. 9). For example, the time, date, sales clerk number, dollar and time value of the card, the PIN number, etc. may be stored in memory 110M. Later, such as at night when long distance rates are cheapest, when the store is closed, or at any other suitable time, all information from previous transactions may be transmitted from the terminal 110 to the host computer system 601 for further processing (step 905 of FIG. 9). For example, the host computer system 601 may generate reports regarding sales, billing, accounts receivable, etc. which may be sent to the store owner, etc. 605 (step 907 of FIG. 9).

After the terminal 110 transmits data regarding previous transactions to the host computer system 601, the host computer system 601 may download additional PIN numbers, etc. to the terminal's memory 110M for subsequent sales (step 906 of FIG. 9). For example, if ten PIN numbers are dispensed during one day, then after the terminal 110 transmits the information about the ten transactions to the host computer system 601, the host computer system 601 may download ten new PIN numbers to the terminal 110 to replenish its stock. Again, the transmission of transactional information from the terminal 110 to the host computer system 601, and the subsequent replenishment of PIN numbers from the host computer system 601 to the terminal 110, maybe readily implemented using standard software and communication techniques.

In on, embodiment, each PIN number may be stored in memory 110M along with a monetary or time value for the PIN number. In this case, when a consumer purchases a card 12 for a specific monetary or time value, a PIN number would be selected that was associated with this value. For example, at a particular point in time, memory 110M may store 100 PIN numbers associated with a $10 monetary value and 100 PIN numbers associated with a $5 monetary value. If a consumer purchased a card 12 for $5, the processor 701 of the terminal 110 would select one of the PIN numbers associated with the $5 value, resulting in 99 PIN numbers remaining with a $5 value and 100 PIN numbers remaining with a $10 value. By using this approach, the host computer system 601 can download new PIN numbers to the memory 110M of the terminal 110 along with known monetary or time values, so that after the consumer purchases a card 12 with a PIN number, the host computer system 601 will know the initial value of the PIN number (before the terminal 110 later transmits information about the sale to the host computer system 601).

In another embodiment, the PIN numbers can be initially stored in memory 110M without an associated monetary or time value. In this case, a consumer can purchase a card 12 with a PIN number in any monetary or time value (e.g., $10, $5.75, 30 minutes, etc.), and that information will be stored in memory 110M for later transmission to the host computer system 601. Of course, by using this approach, the host computer system 601 will not determine the value of a PIN number until the terminal 110 transmits this information to the host computer system 601. However, this approach can provide flexibility as to the initial values that may be assigned to a PIN number.

If a retail store experiences heavy sales of cards 12 with PIN numbers, etc., through its terminal 110, the present invention may be implemented so as not to wait until night, etc., to transmit the transaction information to the host computer system 601. Rather, the terminal 110 may be programmed to transmit the transactional information to the host computer system 601 any time its PIN number supply is running low, so that the terminal's 110 supply of PIN numbers is replenished.

Because the system of the present invention does not require real-time access to by the terminal 110 to the host 601 (FIG. 6) in order to dispense PIN numbers, etc., the present invention may be deployed not only in conventional retail locations, but also in remote locations such as ocean-going vessels, airplanes, kiosks, taxicabs, etc. Furthermore, the maximum inventory level of PIN numbers, etc., in the memory 110M of a terminal 110 is only limited by the size of the memory 110M, which can be expanded as needed to allow the terminal 10 to operate off-line for as long as necessary.

Additionally, because of the secure, encrypted downloading of PIN numbers, etc., by the terminal 110, and the secure storage of the same in memory 110M, the PIN numbers, etc., can be sent to the terminal pre-activated. Accordingly, no special programming is necessary to activate the PIN numbers at the telephone switch, etc., and thus the present invention may be deployed rapidly.

The type of information that may be printed on the card 12 by the printer 20 is quite flexible. For example, not only may the PIN number and access number be printed on a card 12, but other information may be printed as well, such as: the name and contact information for the long distance provider, the cost per minute of a call, customer service telephone numbers, the date of sale, the location of purchase, advertising info, etc. The owner of the retail store, the operator of the host system 601, and/or others may be allowed to change the information to be printed on the card 12 on-the-fly, by dialing into the terminal 110 via the modem 705 (e.g, at night), or through an equivalent mechanism.

Referring to FIG. 10, a sample report is shown illustrating the level of detail that may be reported regarding each transaction made by way of the present invention. Because detailed transactional data may be stored in memory 110M after each pre-paid card is sold, and this data may thereafter be transmitted to the host computer system 601, the host computer system 601 may provide a high level of detail to a computer system 605, etc., operated by the owner of the retail establishment where the terminal 110 is installed. For example, for a retail establishment having multiple locations (and hence multiple terminals 110), and multiple sales clerks, the host computer system 601 may generate a report that indicates the particular store 1001 where the sales were made; the clerk 1002 who made the sale; the date 1003 and time 1004 of the sale; the number of phone card units 1005 sold; the retail price 1006 of each sale; and the wholesale price 1007 of each sale; the totals 1008 for the store, etc. Thus the host computer system 601 may provide detailed information regarding the usage of the terminal 110, which can prove to be quite useful to the store owner.

In addition to the reporting capability described above, each terminal 110 may also be used for reporting purposes. Because the terminal 110 is being used to store and dispense valuable inventory it is imperative that retailer have the capability to take both regularly scheduled and ad-hoc readings of sales and inventory information. The current architecture supports this feature through a variety of useful sales and inventory reports.

It is important to note that these reports may be generated locally by the terminal 110—the terminal 110 need not contact the host computer 601 to generate sales reports. Reports can include but are not limited to the following: Z-Total and X-Total readings (similar to those found on even the most basic cash register), last 10 transactions detail, sales by employee, etc.

Since the inventory being stored inside the terminal 110 represents valuable inventory to the retailer it is necessary to prevent unauthorized personnel from being able to access the inventory and also to "fingerprint" each transaction so that a complete audit trail of the transaction exists. This may be accomplished through the use of employee identification codes, or equivalent. These secret codes may, for example, range in length from 1 to 9 digits (the length of the code being determined by the retailer based on the value of the information they are trying to protect balanced against the ability of an employee to remember the code and the time it takes to enter the code during a transaction). Without a proper code a would-be thief is not able to access the system. When an authorized employee enters a valid code, the employee identification number (not the code itself) is stored with the transaction record. In this way the transaction can be traced directly back to the employee (thus the transaction may be referred to as being "fingerprinted"). This can have many applications ranging from providing sales analysis by employee to enabling employee incentive programs and contests based on the total amount of inventory sold in a given period by each employee.

Figure 11:
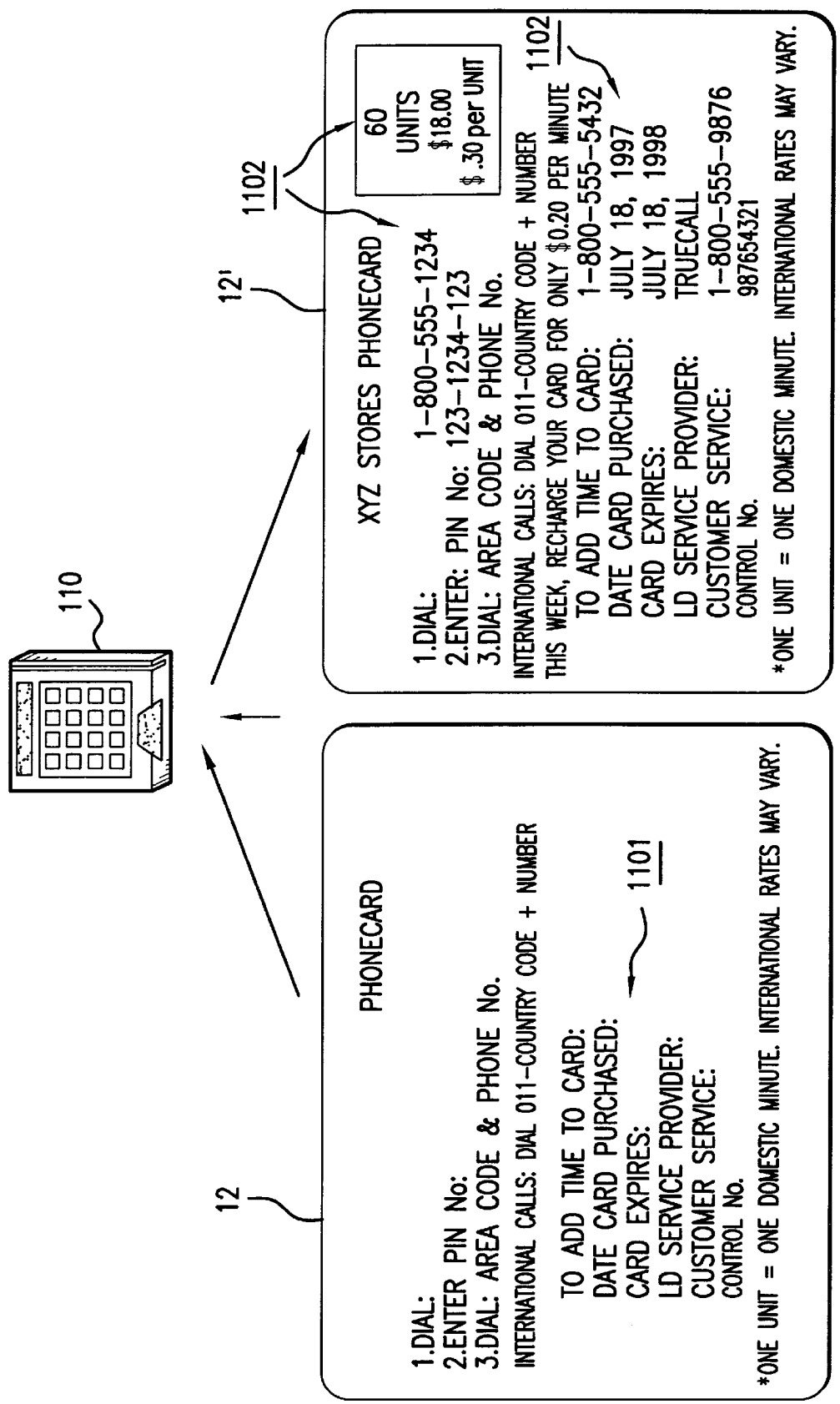
FIG. 11 depicts a sample card that may be used with the present invention.

FIG. 11 illustrates a sample card 12 that may be utilized with a terminal 110 of the present invention, in one embodiment. As shown, card 12 may include pre-printed information 1101, or in another embodiment it may be completely blank. After card 12 is inserted into terminal 110 according to the processes described above, information 1102 may be printed on the card by the terminal 110, as shown as card 12'. The information 1102 is shown for illustrative purposes only, for a pre-paid phone card application, but of course any suitable information may be printed on the card 12 by terminal 110.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only.

We claim:

1. A system for point of sale dispensing of cards comprising:

(a) a host computer system; and
   (b) a remote terminal device adapted to be selectively coupled to the host computer system via a communication link, the remote terminal device comprising:
      (i) a terminal memory that stores a plurality of informational data sets;
      (ii) a recording device that copies informational data sets from the terminal memory onto a substrate;
      (iii) an input device, and
      (iv) a processor programmed to execute the following steps:
         (1) upon receipt of a pre-selected input from the input device, selecting a personal identification number from the terminal memory;
         (2) causing the recording device to copy the selected personal identification number onto the substrate;
         (3) flagging a memory location in the terminal memory to indicate that the selected personal identification number has been used; and
         (4) upon a determination that a predetermined number of informational data sets in the terminal memory remain unflagged, replenishing the available informational data sets by performing the following substeps:
            (A) initiating a communication between the remote terminal device and the host computer system via the communication link;
            (B) indicating to the host computer system that the flagged informational data sets have been used;
            (C) downloading a plurality of informational data sets from the host computer system into the terminal memory; and
            (D) disconnecting the communication between the remote terminal device and the host computer system after the downloading substep.

2. The system of claim 1, wherein the substrate used by the recording device is a receipt.

3. The system of claim 1, wherein the recording device is a printer.

4. The system of claim 1, wherein the informational data sets comprise personal identification numbers.

5. The system of claim 1 wherein the input device is a keypad.

6. The system of claim 1, wherein the substrate used by the recording device is a card.

7. The system of claim 6, wherein the card is a pre-paid communication services card.

8. The system of claim 1, wherein the processor performs the additional step of (5) storing transaction information associated with the selected personal identification number in the terminal memory.

9. The system of claim 8, wherein the processor performs the additional substep of:

(E) transmitting the transaction information associated with the flagged informational data sets to the host computer.

10. A system for point-of-distribution vending of cards comprising:

(a) a host computer system; and
    (b) a remote terminal device adapted to be selectively coupled to the host computer system via a communication link, the remote terminal device comprising:
       (i) a terminal memory that stores a plurality of informational data sets;
       (ii) a recording device that copies informational data sets from the terminal memory onto a substrate;
       (iii) an input device; and
       (iv) a processor programmed to execute the following steps:
          (1) upon receipt of a pre-selected input from the input device, selecting a personal identification number from the terminal memory;
          (2) causing the recording device to copy the selected personal identification number onto the substrate;
          (3) flagging a memory location in the terminal memory to indicate that the selected personal identification number has been used; and
          (4) at a pre-specified time selected to minimize cost, replenishing the available informational data sets by performing the following substeps:
             (A) initiating a communication between the remote terminal device and the host computer system via the communication link;
             (B) indicating to the host computer system that the flagged informational data sets have been used;
             (C) downloading a plurality of informational data sets from the host computer system into the terminal memory; and
             (D) disconnecting the communication between the remote terminal device and the host computer system after the downloading substep.

11. The system of claim 10, wherein the substrate used by the recording device is a receipt.

12. The system of claim 10, wherein the recording device is a printer.

13. The system of claim 10, wherein the recording device is a magnetic stripe writer.

14. The system of claim 10, wherein the input device is a keypad.

15. The system of claim 10, wherein the substrate used by the recording device is a card.

16. The system of claim 15, wherein the card is a pre-paid telephone card.

17. The system of claim 10, wherein the processor performs the additional step of (5) storing transaction information associated with the selected personal identification number in the terminal memory.

18. The system of claim 17, wherein the processor performs the additional substep of:

(E) transmitting the transaction information associated with the flagged informational data sets to the host computer.

19. A method for replenishing informational data sets in a terminal memory of a point-of-distribution card vending terminal comprising the steps of:

(a) determining the number of unused informational data sets remaining in the terminal memory; and
    (b) upon determining that fewer than a predetermined number of informational data sets in the terminal memory remain unused, performing the following substeps:

(i) initiating a communication between the remote terminal device and a host computer system via a communication link;
(ii) indicating to the host computer system that the used informational data sets have been used;
(iii) downloading a plurality of informational data sets from the host computer system into the terminal memory; and
(iv) disconnecting the communication between the remote terminal device and the host computer system after the downloading substep.

20. A method for replenishing informational data sets in a terminal memory of a point-of-distribution card vending terminal comprising the steps of:

(a) assessing current time; and (b) upon a determining that the current time meets a prespecified time selected to minimize cost, performing the following substeps;
(i) initiating a communication between the remote terminal device and a host computer system via a communication link;
(ii) indicating to the host computer system that the used informational data sets have been used;
(iii) downloading a plurality of informational data sets from the host computer system into the terminal memory; and
(iv) disconnecting the communication between the remote terminal device and the host computer system.

* * * * *